Nov. 14, 1972     T. E. HEFFINGTON     3,702,677

ANIMAL REPELLENT PACK

Filed Sept. 10, 1970

Thomas E. Heffington
INVENTOR.

BY James F. Weeter
Paul L. DeWitt II
Henry W. Hope
ATTORNEYS

United States Patent Office 3,702,677
Patented Nov. 14, 1972

3,702,677
ANIMAL REPELLENT PACK
Thomas E. Heffington, 4605 Valerie,
Houston, Tex. 77401
Filed Sept. 10, 1970, Ser. No. 71,019
Int. Cl. A61l 9/04
U.S. Cl. 239—55                                    5 Claims

ABSTRACT OF THE DISCLOSURE

The present invention is directed to a disposable package or pack which may be used in conjunction with disposable garbage containers, particularly paper or plastic bags, to prevent the destruction of them or the access to their contents by animals. The preferred embodiment of the present invention is comprised of a package which encloses a breakable sealed container. Carried in the container is a suitable animal repellent. The package itself allows the passage of the animal repellent through its walls at a controlled rate so that the repelling substance will be given off over an extended period of time. The tube is broken by the user, the package is placed in the garbage container and the container is then sealed. The interior of the container will thus become filled with the repelling scent to drive off any animal.

BACKGROUND OF THE INVENTION

The present invention is directed to apparatus for repelling animals, and more particularly to devices which may be used with garbage containers such as disposable plastic or paper bags.

In the past, a major problem in the collection of garbage has been created by the fondness of animals, rodents or the like for such garbage. As a result, it is a common sight to see garbage cans overturned and their contents scattered about. Not only is this unsightly and unsanitary in creating a health hazard, but it also makes collection of the garbage extremely difficult. In most instances, garbage collectors simply do not have the time or the inclination to collect the scattered garbage, and as a result it is is left to the home or business owner. The result in either instance is certainly unsatisfactory.

In most metropolitan areas, the third largest item on any municipalities budget is garbage collection and disposal. Of this item, collection accounts for approximately ninety percent of the amount. As our population centers grow, more and better techniques must be devised for the collection of garbage to prevent the task from becoming even more staggering than it now is. A further problem is found in the fact that garbage collection personnel do not stay on the job in a very reliable fashion and, accordingly, the turnover in such personnel often severely hampers a city's garbage collection effort.

One of the more recent ideas that has been brought forward in attempting to make garbage storage and collection easier is the use of plastic or paper bags (hereinafter sometimes referred to as "bags"). These are becoming increasingly popular due to their low cost, wide availability and ease of handling by collectors. Furthermore, since the bags themselves are disposable, automated techniques are being explored and developed for picking them up, such as is found in my co-pending application Ser. No. 828,832, filed May 29, 1969, entitled Mobile Refuse Retriever.

One drawback to the use of such bags is that they are even more susceptible to destruction by animals, rodents, etc. (hereinafter referred to as "animals') than are the garbage cans. To maintain the cost as low as possible, these bags are made of film or paper that is quite thin and easily torn by animals, or chewed through by rodents.

Companies in the past have attempted to overcome these problems by the incorporation into the material of the package itself a repelling substance. This approach is shown by U.S. Patent No. 2,510,367, but has not been particularly successful in repelling animals. Unfortunately, this approach has also increased the cost of the bags which further limits their acceptance. In addition, it is not necessary that all bags contain an animal repellent since they may be used for items such as grass clippings, which would not attract animals. As a final disadvantage, people tend to accept any plastic or paper bag as being suitable for storing food. Use of a bag with this "built in" repellent would probably ruin the food, and possibly result in serious bodily harm to anyone eating food after it was stored in such a bag.

SUMMARY OF THE INVENTION

The present invention is directed to a disposable package which may be placed in a garbage container and will emit a regulated amount of animal repellent over a controlled period of time. One embodiment of the present invention is comprised basically as follows.

A first element in the embodiment comprises a package made from a porous material which will allow the repelling substance to flow through and into the container into which the package is placed. The material from which the package is made may be of any substance which will allow the repellent to move at a controlled rate so that it will be emitted over a long period of time. A vial or tube is contained within the package, and is normally sealed. It carries the repelling substance in liquid or gaseous form. The tube or container is breakable, and upon use is broken simply by squeezing the package. This will allow the repelling substance to enter into the interior of the package from which it will slowly seep into the garbage container.

It is, therefore, an object of the present invention to provide a satisfactory animal repellent in conjunction with garbage containers and particularly disposable ones such as plastic and paper bags.

Another object of the present invention is to provide an animal repellent which will supply the repelling substance over an extended period of time.

Yet another object of the present invention is to provide an animal repelling package which will be economical and simple to manufacture as well as use.

Still another object is to provide such a repellent package which is disposable along with the contents of the garbage container or the disposable garbage container itself. Another object is to provide an animal repellent article of manufacture which may be selectively used as desired by the home or business owner.

A final object of the present invention is to provide such an animal repellent package which may be used with any type or size of garbage container.

DESCRIPTION OF THE PREFERRED EMBODIMENT

Figure 1:
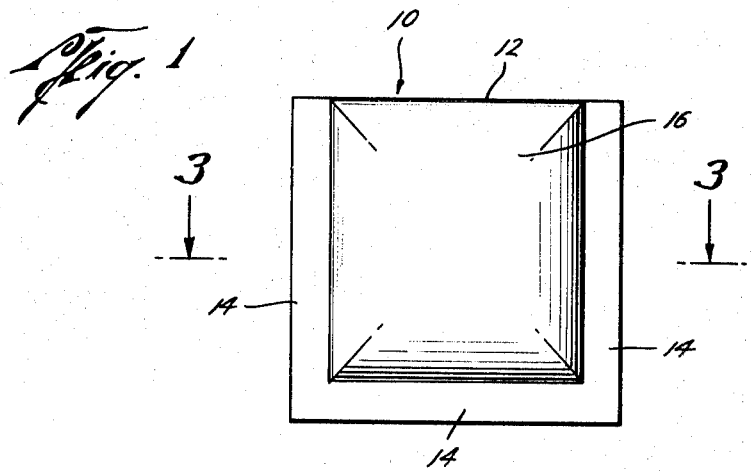
FIG. 1 discloses a side view of the exterior of a preferred embodiment of the present invention, FIG. 2 discloses a side view, partially in section, of the article shown in FIG. 1 and showing the animal repellent containing vial.
Figure 2:
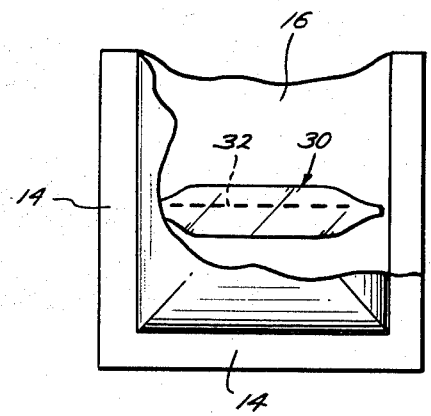
Figure 3:
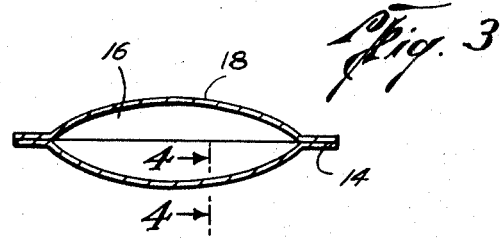
FIG. 3 is a section view of the package as seen along Section Lines 3—3 of FIG. 1

Turning now to FIG. 1 there is shown an overall view of the pack which is generally indicated by the numeral 10. In this preferred embodiment it is made simply by using a rectangular piece of material and folding it about the edge 12. The remaining three sides are then sealed as at 14 by any suitable means such as adhesive or by fusion where a suitable material has been used to form the pack. This procedure leaves a pocket 16 which may be more clearly seen in FIG. 3. In FIG. 2 there is shown the container or tube 30 which contains the animal repelling substance 32.

Figure 4:
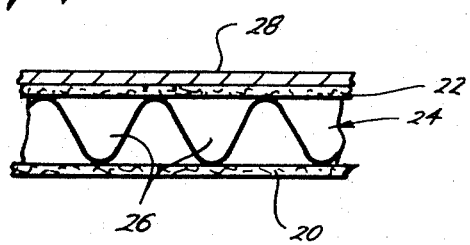
FIG. 4 is a partial section view of the side wall of a preferred embodiment of the package.

Turning now to FIG. 4 there is shown a section view through the side wall of the package 10, this side wall being generally indicated by the numeral 18. In this preferred embodiment, the outermost layer 20 is comprised of a gauze material, as is the innermost layer 22. Lying between the two gauze layers 20 and 22 is a sheet 24 of a corrugated material, such as a suitable porous paper. Due to the corrugations, openings 26, are located in this inner wall. Finally, the inner most surface of the inner gauze layer 22 may be coated with grease or wax as at 28. In the manufacture of this embodiment, a rectangular sheet of the material from which the pack is to be constructed is coated with the grease 28 on one of its sides. The vial or container 30 bearing the animal repelling substance is then placed generally in the center of the sheet of material, and the material is folded along the edge 12 shown in FIG. 1. The vial may be made from glass, plastic, wax, polyethylene or foil, as well as other possible materials. The three open edges are sealed as at 14 by any suitable means such as an adhesive. The pack is now complete and ready for use. As will be readily understood the pack may be stored for an indefinite period of time before it is used, due to the fact that the animal repelling substance is completely contained with in the vial 30. Thus, none of its scent escapes nor will it deteriorate except over a very long period of time, and the product will have satisfactory shelf life to be commercially feasible.

Upon use, the user need merely break the vial 30 which may be done by simply applying pressure with his fingers. The pack 10 is then dropped into the garbage container and the container is sealed by either placing the lid on the garbage can or by tying or folding the neck of a garbage bag. The breaking of the vial 30 will result in an immediate release of the repellent 32 into the inner chamber 16 of the package. The grease 28 will be contacted, and this will slow the seepage or movement of the repellent through the side walls 18. The primary purpose of the grease on the interior of the presently discussed embodiment is to prevent the immediate flow of the liquid or gaseous repellent through the package. The grease will give the user time to deposit the pack into the garbage container without any irritation or discomfort on the part of the user. In addition the walls and corrugated portions of the sidewalls must have a proper porosity to prevent the rapid escape of the repellent. It is by the use of a suitably porous side wall and by the retarding effects of the grease that the repellent is allowed to escape slowly thereby providing a continuous discharge over a long period of time. As will be readily understood, this would be necessary due to the fact that garbage containers must sit out after they have been completely filled for some period of time.

Accordingly, the result will be a continuous discharge of animal repellent from the packet 10 into the interior and contents of the garbage container. Assuming that this is a plastic bag that has been tied at the neck, the bag will soon become filled with the scent of the repellent. Should a rodent, dog or the like tear into the bag, the repellent will attack its eyes and nostrils, thereby driving them away.

Such an attack would, of course, tear the bag or the bag might become torn in normal use. Should this happen a certain amount of leakage of the repellent will occur. This should not result in any excessive, unpleasant or irritating odor except possibly for someone very close to the container. This is, however, yet another reason to insure that the repellent given off by the pack 10 will continue for several hours to insure a continuing supply after the bag has been torn.

As will be readily understood, the rate of movement of repellent through the package (the sorption-desorption rate), and the period of time over which this continues may be varied as desired. Various factors will go into determining the sorption-desorption rate, some of which include the thickness of the paper from which the package is made; its porosity; the type of glue or bonding agent used in the paper; whether or not this bonding agent is solvent in the particular repellent used; the amount of wax or grease in the paper, etc. In addition, fabric may be used to make the pack, or fabric may be combined with paper, gauze or the like. At the same time the repellent substance itself may be varied, each of which may react differently with different package materials. Ammonia was used in the above-described package and proved satisfactory, but other known animal repellents may be used such as oil of citronella, allyl isothecyanate, or lemon grass. As will be readily understood, it will be necessary to determine exactly the rate and period of discharge that is desired and to vary the type of materials or ingredients used to prepare the pack along with the particular repellent used to achieve the desired results. The variety of combinations are, of course, too numerous to list.

Discussing further this aspect of the present invention, the sorption-desorption rate can be controlled by various methods to obtain the desired length of protection each individual packet will produce. The number of layers of paper; the grade of paper; the intercellular spaces in the paper; the coating of the paper; the treatment of the stock preparation by brushing, cutting, and fibrillation, etc.; the selection of the type of pulp and the selection of cellulose fibers of various origins; and treated by a variety of physical and chemical methods, descriptions of which are beyond the scope of this work. Additionally, the amount of moisture take up is partly governed by the degree of crystallinity of the cellulose systems.

Sorption of the paper may be divided into three different types generally termed adsorption, imbibition, and capillary absorption. Although adsorption will certainly take place to a certain degree, generally a high rate of imbibition and capillary absorption will account for a greater amount of total sorption. The phenomenon of hysteresis will of course control to a certain degree the rate of desorption in the closed container.

In addition to the example give above, several methods and combinations of paper and absorbent materials, such as cotton have been tried and proven successful. Another inexpensive method used to slowly disperse the liquid over a period of time has been a packet consisting of three layers of paper. The inner layer was made of a grease proof type paper with a thinly spread coating of grease on the innermost side of the paper. The second layer was made of an absorbent blotter type power such as a paper towel. The third or outer layer was made from a heavy unbleached paper sack. This pack was still emitting some moisture after 24 hours. Other possible embodiments are as follows:

One suitable embodiment was made from a Jet-Pak bag from Columbian Ropi Co. of Auburn, N.Y., with a Government specification of PPP S-30. This is a two-sheet brown paper sacking with approximately one quarter inch of ground newsprint between each sheet. The package was comprised of this bagging folded, and therefore, the sidewalls of the package contained four sheets of the brown sacking and two layers of ground newsprint. One such package was made having a thin layer of grease on the innermost surface of the package.

In each of the packages three-eighths ounce (3/8 oz.) of household ammonia was poured and the packages sealed shut. The packages took approximately one minute to become moist. Both were placed in garbage containers and left outside. Over twenty-four hours later, the bags were reopened and all packs were still moist and disbursing sufficient fumes to render them still effective for animal and rodent repelling purposes. The highest temperatures reached during this period of time was approximately 85° F.

Another satisfactory embodiment was comprised of a package having a cotton layer of approximately 1/8 inch between two pieces of ordinary brown paper sacking. A second slight modification of this package was one comprised of approximately 1/8" layer of cotton between the Jet-Pak paper with most of the ground newsprint removed. All bags in these examples were approximately 3" x 3½" in size.

In each of the above packages, 3/8 oz. of household ammonia was poured and they were placed in a plastic sack containing garbage. The temperature this day reached a high of approximately 87° F. Again, 24 hours later the garbage bag was reopened and the packages were emitting satisfactory odors and fumes.

Another feature of the present invention would be to utilize the vial or the material from which the pack is made to contain other substances that might desirably be placed in garbage containers. By way of example, the use of ammonia as a repellent would also act to kill bacteria in the containers, as well as tending to control the odor of the garbage. In the same manner, insecticides, germicides, disinfectants, deodorants and the like may also be dispensed from the vial or intermixed with the paper covering.

The end result is a convenient, economical method and apparatus to repel animals for use with garbage containers, and particularly for use with disposable containers for the business owner or the house holder. As can be seen, the objectives set forth at the outset have been accomplished by the disclosed embodiments. An economical and simple to manufacture and use device has been disclosed which will deter and drive off animals and rodents from garbage containers. The device is also disposable and accordingly, may be used with disposable garbage bags and other containers. The device is effective in providing a continuous discharge of animal repellent over a period of time, which period may be varied. This is true regardless of whether the garbage container has been ripped open or remains sealed. Furthermore, the user has the choice of using the repellent pack or not, depending upon the contents of the garbage in the container. The manufacturer has the advantage of being able to add substances such as disinfectants and deodorants, thereby giving him wide flexibility in the product that he can market.

The present invention, therefore, is well adapted to carry out the objects and attain the advantages mentioned, as well as other inherent therein.

What is claimed is:
1. An animal repellent pack comprising,
   a package comprised of porous material, and enclosed within said package,
   a breakable container having therein,
   an animal repelling substance, said package being comprised of,
     an inner layer of gauze,
     a middle layer of corrugated paper, and
     an outer layer of gauze.
2. The invention of claim 1 wherein the package is further comprised of a layer of grease on the inside of the inner layer of gauze.
3. The invention of claim 1 wherein the package is further comprised of a layer of grease on the inner layer of gauze.
4. An animal repellent pack for use in garbage containers comprising,
   an animal repelling substance contained in a container,
   means for automatically dispensing said substance at a controlled rate, including a package inclosing said container, and being at least partially comprised of means through which said substance may pass at a controlled rate,
   said container being further defined as a sealed, breakable container.
5. The invention of claim 4 wherein said dispensing means is further defined as including, a package comprised of porous material.

References Cited
UNITED STATES PATENTS

| | | | |
|---|---|---|---|
| 2,209,914 | 7/1940 | Gerber et al. | |
| 3,550,853 | 12/1970 | Gray | 239—044 |
| 2,371,667 | 3/1945 | Arena et al. | |
| 2,579,403 | 12/1951 | Slomowitz et al. | 128—268 |
| 3,306,292 | 2/1967 | Spees | 128—268 |

M. HENSON WOOD, Jr., Primary Examiner

M. Y. MAR, Assistant Examiner

U.S. Cl. X.R.

128—268; 206—56 A; 239—47